United States Patent [19]

Thompson

[11] Patent Number: 5,563,186
[45] Date of Patent: Oct. 8, 1996

[54] CROSSLINKED ALGINATE-BASED GELS FOR MATRIX CONFORMANCE

[76] Inventor: Ronald G. Thompson, 1616 12th Ave., Greeley, Colo. 80631

[21] Appl. No.: 342,945

[22] Filed: Nov. 21, 1994

[51] Int. Cl.⁶ .................................................. C09K 7/00
[52] U.S. Cl. ..................... 523/130; 523/131; 507/209; 507/211; 507/219; 507/221; 507/224; 507/225; 507/230; 507/269; 507/270; 507/271; 507/272; 507/277; 507/922
[58] Field of Search .......................... 523/130, 131, 523/132; 507/110, 209, 211, 219, 221, 224, 225, 230, 269, 270, 271, 272, 277, 922

[56] References Cited

U.S. PATENT DOCUMENTS

| | | | |
|---|---|---|---|
| 2,174,027 | 9/1939 | Ball | 507/110 |
| 2,211,688 | 8/1940 | Byck et al. | 507/110 |
| 3,208,524 | 9/1965 | Horner et al. | 166/32 |
| 3,615,794 | 10/1971 | Nimerick | 106/208 |
| 3,640,741 | 2/1972 | Etes | 106/170 |
| 3,935,099 | 1/1976 | Weaver et al. | 524/734 |
| 3,960,736 | 6/1976 | Free et al. | 252/8.55 R |
| 4,022,633 | 5/1977 | Schneider | 106/208 |
| 4,043,952 | 8/1977 | Ganslaw et al. | 524/734 |
| 4,192,727 | 3/1980 | Ward | 524/732 |
| 4,302,869 | 11/1981 | Elmquist | 524/734 |
| 4,579,175 | 4/1986 | Grodde et al. | 166/295 |
| 4,606,407 | 8/1986 | Shu | 166/270 |
| 4,915,174 | 4/1990 | Berrod | 166/305.1 |
| 4,954,539 | 9/1990 | Cavezzan et al. | 524/732 |
| 5,144,016 | 9/1992 | Skjak-Braek et al. | 536/3 |

*Primary Examiner*—Nathan M. Nutter
*Attorney, Agent, or Firm*—Jack L. Hummel; Jack E. Ebel

[57] ABSTRACT

A composition of matter for matrix conformance formed from an aqueous solution of an alginate polysaccharide and a method of forming an alginate polysaccharide gel. A Group IIA cation, $Fe^{2+}$, $Fe^{3+}$, $Al^{3+}$, $Mn^{2+}$, $Zn^{2+}$, a dialdehyde, or a diamine may be used to crosslink the resulting alginate gel. The gel may also comprise a modifier, such as a polyvinyl alcohol, a polycarboxylic acid, or a polyacrylamide. The rate and extent of crosslinking are controlled by varying the alginate molecular weight, the alginate concentration, or the type and concentration of crosslinker, or by adding a sequestering agent such as EDTA or citrate.

23 Claims, 3 Drawing Sheets

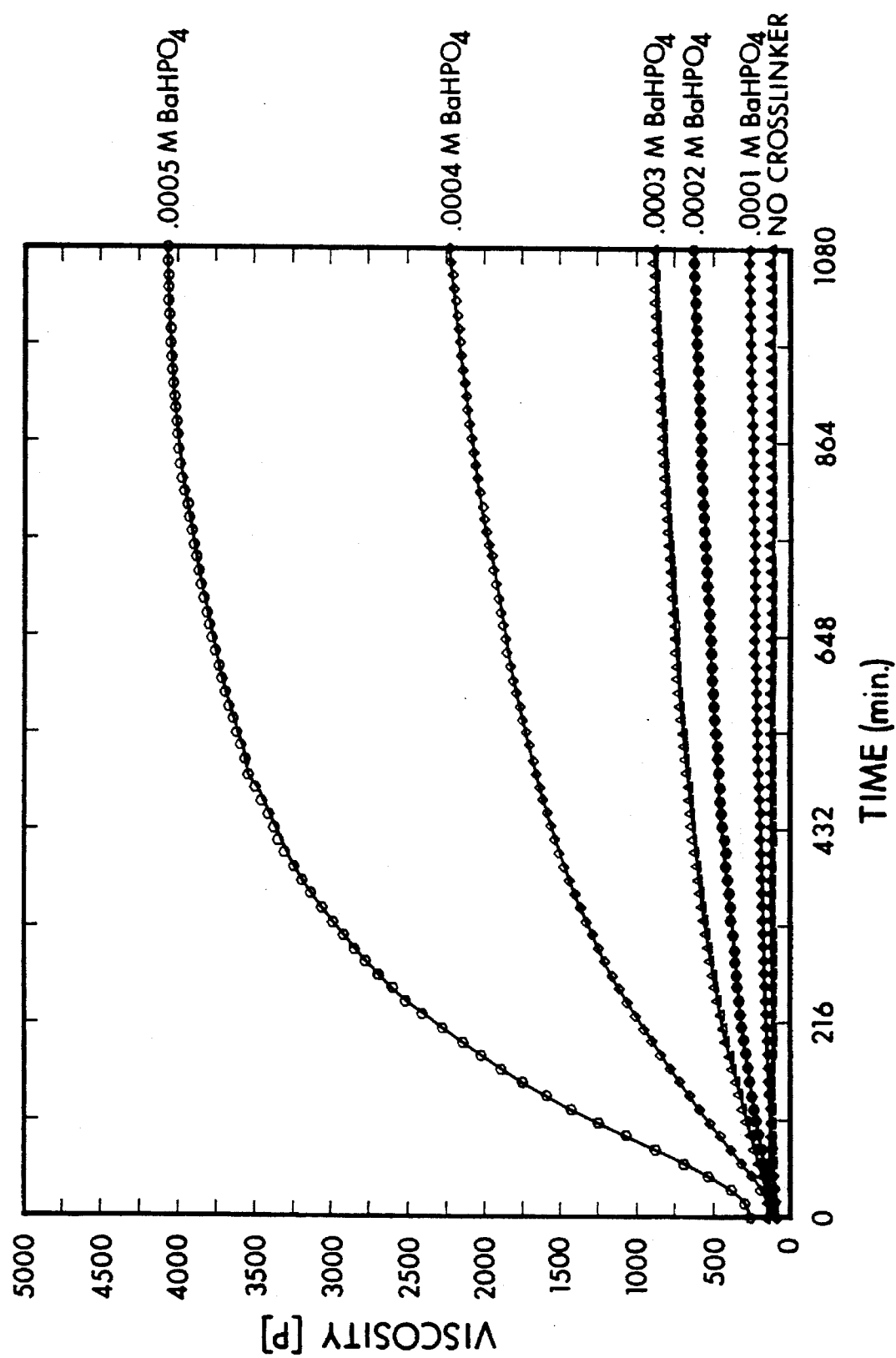

CROSSLINKED ALGINATE-BASED GELS FOR MATRIX CONFORMANCE

BACKGROUND

1. Technical Field

The present invention relates to a composition of alginate gels and a method for use thereof for flow profile modification in subterranean hydrocarbon reservoirs.

2. Description of the Related Art

A commonly encountered problem in producing hydrocarbons from a subterranean reservoir is that injected or produced fluids flow preferentially through some portions of the reservoir and bypass other portions. Flow profile modification is a method by which the flow of fluids from one portion or portions of the reservoir is diverted to another portion or portions. One approach to flow profile modification in hydrocarbon reservoirs has been to fill the pore spaces in the more permeable zones with a gelled material. However, it is necessary to control the properties of the gel. Injecting the different components of a gelable composition either sequentially or simultaneously into the formation may result in incomplete mixing of the components and little or no gelation. Yet, if the components are mixed at the surface and gel substantially prior to injection, the material can't be pumped easily. Thus, it is desirable to formulate a composition with a controllable rate of gelation which allows formulation at the surface, subsequent pumping into one or more wells in communication with the reservoir, and gelation after injection into the reservoir.

Synthetic polymer gels have been used extensively for flow profile modification in hydrocarbon reservoirs. The rate and extent of gelation of polyacrylamide gels are controllable if multivalent heavy metal cations are used to crosslink carboxyl groups of the polymer chains. Cr(III) is a particularly desirable crosslinking agent. However, chromium is increasingly subject to environmental regulations.

Polysaccharide gels formed with naturally occurring biopolymers are an alternative to gels formed with synthetic polymers. Polysaccharides are environmentally innocuous; in many cases, they have been approved for use as food additives. The breakdown products of these gels are sugars, some of which are easily digested by microbes. Many polysaccharide gels are subject to direct microbial attack and, therefore, pose problems for long-term use. Polysaccharide gels also tend to undergo syneresis, or loss of fluid, upon standing.

Accordingly, it is an object of the present invention to provide a gel composition for flow profile modification in hydrocarbon reservoirs which is not subject to environmental regulations, has controllable gelation properties, is not subject to microbial attack, and undergoes minimal syneresis. It is a further object of the present invention to provide a composition that does not react unfavorably with fluids present in the oilfield environment.

SUMMARY OF THE INVENTION

To achieve the foregoing and other objects, and in accordance with the purposes of the present invention, as embodied and broadly described herein, one characterization of the present invention comprises an aqueous alginate polysaccharide-based composition capable of forming a gel. The composition comprises an aqueous solution of an alginate polysaccharide; a crosslinking agent selected from the group of Group IIA cations, $Fe^{2+}$, $Fe^{3+}$, $Al^{3+}$, $Mn^{2+}$, $Zn^{2+}$, dialdehydes, diamines, and mixtures thereof; and a modifier selected from the group of borates, polyvinyl alcohols, polycarboxylic acids, polyacrylamides, and mixtures thereof. The alginate polymer has a molecular weight between about 80,000 Daltons and about 200,000 Daltons and is present in the aqueous solution in an amount up to about 10 percent by weight. The crosslinking agent is present in an amount between about 0.0001M and about 0.05M, and the modifier is present in an amount up to about 5 percent by weight.

The rate and extent of crosslinking can be controlled by varying one or more of the molecular weight of the alginate polymer, the concentration of alginate, and the concentration of the crosslinker in the solution. The gelation rate can also be controlled by adding a solution of a chelant and/or a simple synthetic polymer, such as a polyvinyl alcohol, a polycarboxylic acid, or a polyacrylamide with a concentration of a few percent by weight. The synthetic polymer can also help combat syneresis and control the gel strength.

Another characterization of the present invention comprises a method for forming an alginate polysaccharide gel. An aqueous solution is prepared which contains an alginate polysaccharide; a crosslinking agent selected from the group of Group IIA cations, $Fe^{2+}$, $Fe^{3+}$, $Al^{3+}$, $Mn^{2+}$, $Zn^{2+}$, dialdehydes, diamines, and mixtures thereof; a modifier selected from the group of borates, polyvinyl alcohols, polycarboxylic acids, polyacrylamides, and mixtures thereof, and, optionally, a sequestering agent such as EDTA or citrate. The solution is allowed to form a gel. The alginate polymer has a molecular weight between about 80,000 Daltons and about 200,000 Daltons and is present in an amount up to about 10 percent by weight. The crosslinking agent is present in an amount between about 0.0001M and about 0.05M, and the synthetic polymer is present in an amount up to about 1 percent by weight.

In yet another characterization, alginate gels formed as described above can be used to modify fluid flow profiles in subterranean hydrocarbon reservoirs. The solution is injected into the reservoir and allowed to gel in the reservoir or in fractures and voids within the reservoir.

The use of alginate and the above mentioned crosslinking agents is environmentally attractive because these substances are relatively nontoxic.

BRIEF DESCRIPTION OF THE DRAWINGS

These and other features, aspects, and advantages of the present invention will become better understood with reference to the following description, appended claims, and accompanying drawings where:

FIG. 2a and FIG. 2b are two graphs showing the results of rheometer measurements to determine G' and viscosity of alginate gels of the present invention with varying concentrations of $BaHPO_4$ crosslinker.

DESCRIPTION OF THE PREFERRED EMBODIMENTS

Figure 1:
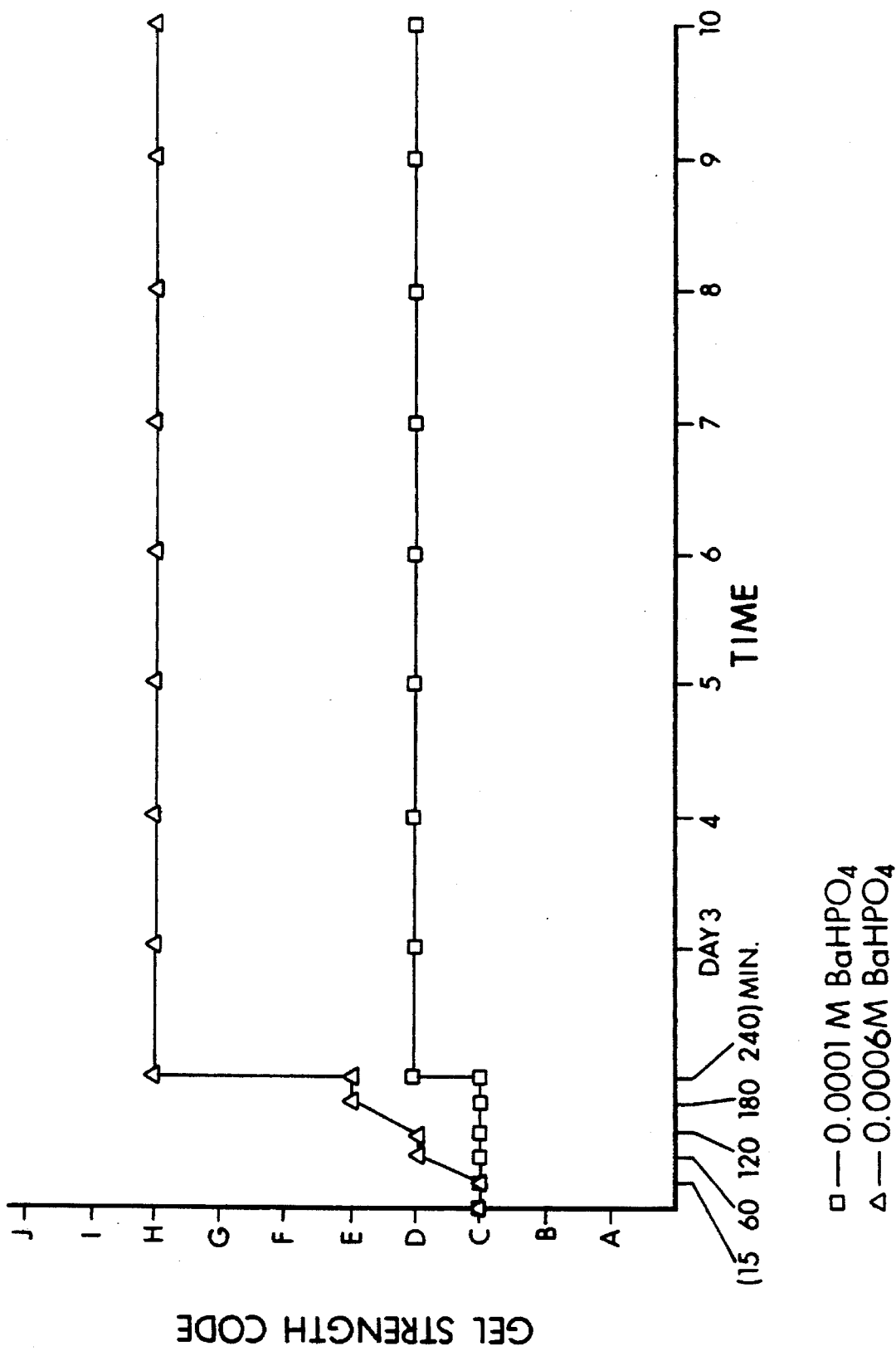
FIG. 1 is a graph showing the results of qualitative $BaHPO_4$ crosslinked gel strength determinations for alginate gels of the present invention formed with varying crosslinker concentrations.

In the following description, the term "alginate" refers to a salt or solution of a polysaccharide biocopolymer comprised of guluronic acid and mannuronic acid. Preferably, the alginate is derived from the giant kelp, *Macrocystis pyrifera*, available commercially from Sigma Chemical Company, St. Louis, Mo., as "Alginic Acid, Sodium Salt," from *Mac. Pyr. High Visc.* (14,000 cps for 2% solution at 25° C.).

As used in the following description, the term "sequestering agent" refers to any agent which affects the availability of an ion in a solution. A sequestering agent may be a chelant which forms a complex with a dissolved ion and retards the ion from forming a more stable complex with another ligand.

A composition according to the present invention comprises a gel formed from an aqueous alginate polysaccharide solution, a crosslinking agent, and a modifier.

The alginate used in this invention can be any water-soluble salt of alginic acid. Sodium alginate is preferred for reasons of economy. The alginate concentration in the aqueous solution can be up to about 10 per cent by weight. Preferably, the alginate concentration is between about 0.5 percent and about 2.0 percent by weight. The average molecular weight of the alginate can be between about 80,000 and about 200,000 Daltons. Using about 2 percent by weight sodium alginate with a molecular weight between about 80,000 and about 120,000 Daltons results in a solution with a viscosity of about 3500 cp. Using about 2 percent sodium alginate with a molecular weight between 120,000 and 200,000 Daltons is preferred, resulting in a solution with a viscosity of about 14,000 cp.

The aqueous alginate solution should be prepared with deionized water or brine which has a very low calcium concentration. Tap water and formation brine generally contain calcium and other cations which will cause premature, uncontrolled crosslinking of the alginate.

A small amount of a preservative, such as sodium benzoate, can be added to the alginate solution to prevent undesired microbial growth in the solution or in the gel. It should be noted that the microbes do not attack the alginate or interfere directly with gelation. However, it is desirable to limit microbial growth because microbes can cause unpleasant odors and destroy the clarity and consistency of the solution. The preservative does not affect the gelation properties of the alginate solution.

In accordance with this invention, the cationic crosslinking agent can be a Group IIA cation, $Fe^{2+}$, $Fe^{3+}$, $Al^{3+}$, $Mn^{2+}$, $Zn^{2+}$, a dialdehyde, a diamine, or mixtures thereof. The crosslinking agent forms bonds between carboxyl groups of adjacent polymer chains. The divalent and trivalent metal ions form ionic bonds, and the dialdehydes and diamines form covalent bonds with the carboxyl groups. The concentration of the crosslinking agent can be between about 0.0001M and about 0.05M, with the preferred concentration between about 0.0001M and about 0.0006M. The preferred crosslinking agent is 0.0006M $Ba^{2+}$, provided in the form of $BaHPO_4$.

The rate of gelation can be controlled by varying the type of crosslinking agent, the concentration of the crosslinking agent, and the temperature. Another way to control the gelation rate is to add a sequestering agent which controls the availability of the crosslinking agent for bonding with the alginate.

Citrate, in the form of sodium citrate, and/or pyrophosphate, in the form of sodium pyrophosphate, can be added as a sequestering agent. Although thermodynamics favors alginate crosslinking by barium over formation of barium citrate and pyrophosphate complexes, the citrate and pyrophosphate can compete with alginate for barium, thus delaying the crosslinking reaction. Dissolved salts of D-gluconic acid also sequester calcium by forming calcium complexes.

Barium phosphate is insoluble in aqueous solutions. However, barium phosphate hydrolyzes slowly in aqueous solutions to form a barium pyrophosphate solution. Adding adipic acid to the solution increases the rate of hydrolysis. Thus, a combination of barium phosphate and adipic acid can be added to the alginate solution to provide a delayed source of barium for crosslinking the alginate.

Alginate gels can undergo syneresis, or loss of water, upon standing. One or more synthetic polymer modifiers, such as a polyvinyl alcohol, a polycarboxylic acid, a polyacrylamide, or a mixture thereof, can be added to the gelation solution to prevent or diminish syneresis.

Polyvinyl alcohol ("PVA")is the preferred modifier. The PVA should preferably be about 87–89 percent hydrolyzed, with a molecular weight between about 13 and about 186 Daltons. Polyvinyl alcohol is relatively insoluble in water and more soluble in methanol. Thus, in accordance with this invention, a solution of PVA in methanol is prepared and then combined with water and alginate. Preferably, the molecular weight should be between about 13 and about 23 Daltons or between about 124 and about 186 Daltons. The low molecular weight PVA is easier to dissolve in an aqueous or methanol solution than high molecular weight PVS. However, the higher molecular weight PVS tends to remain in place longer in the gel.

The composition of this invention can be used to modify injected and produced fluid flow profiles in subterranean hydrocarbon reservoirs. In accordance with this invention, an alginate solution which is capable of forming a gel is injected via a well into a subterranean reservoir to partially fill the pore spaces in the rock matrix, fractures, or voids in the reservoir. Gelation occurs substantially in situ in the reservoir, and the resulting gel plugs the pore spaces. Reservoir flooding fluids are thereby diverted into the unplugged portions of the reservoir.

The composition of this invention provides an environmentally safe gel formulation for use in flow profile modification, for which gel strength and gelation rate can be controlled. The gel is resistant to microbial attack.

The following examples demonstrate the practice and utility of the present invention but are not to be construed as limiting the scope thereof.

EXAMPLES

Example 1

Alginate solutions are prepared with 1.5 percent by weight sodium alginate by combining 15 g of sodium alginate, 1 g of sodium benzoate, and 984 ml of deionized water according to the following procedure. The sodium alginate is derived from *Macrocystis pyrifera*, the giant kelp.

1. Approximately half of the water is poured into a blender, and the blender is adjusted to minimize aeration of the fluid.
2. The sodium benzoate is added to the water in the blender.
3. The sodium alginate is added slowly, and the solution is blended until it has a uniform consistency.
4. The remaining water is added, and the solution is blended until it has a uniform consistency.

5. The solution is then stirred with a lab stirrer at a low to medium setting for 1–2 hours until alginate dissolution is complete.

This solution is the starting material for the experiments described in the following examples.

Example 2

Alginate-PVA solutions containing 1.5 percent by weight alginate and 0.25 or 0.75 percent by weight of PVA are prepared according to the following procedure. The PVA molecular weight is between 13 and 23 Daltons for low molecular weight PVA and between 124 and 186 Daltons for high molecular weight PVA. Solutions are prepared with both concentrations and for each molecular weight range. The sodium alginate is derived from *Macrocystis pyrifera*, the giant kelp.

1. A quantity of high or low molecular weight PVA sufficient to make a solution with the desired weight percent of 87–89 per cent hydrolyzed PVA is put in a container large enough to hold the amount of product needed.
2. 150 ml of methanol is added to the container, and the mixture is therefor allowed to sit until the PVA softens.
3. The softened PVA and methanol are homogenized with a
Kinematica AG/Polytron® PT1200 homogenizer.
4. The PVN/methanol mixture and 350 ml. of deionized water are combined in a blender and blended on the "low" setting
5. An amount of alginate equal to 1.5 percent by weight is added slowly to the solution in the blender and blended until the consistency is smooth.
6. The material is poured into the container that originally held the PVA/methanol mixture and stirred with a lab stirrer and a relatively large paddle for 1–2 hours.

Example 3

Qualitative gel strength measurements are obtained for the gels used in the following examples. 50 g of alginate solution are placed in a 4-oz. wide mouth jar, and the gel strength is determined. The test is initialized with the addition of 1 to 5 ml of crosslinker solution. The gel strength is retested at intervals of 0, 15, 30, 60, 120, 180, 240, and 480 minutes, and then daily. The gel strengths are observed visually and coded according to the following system:

A No detectable gel formed. The gel appears to have the same viscosity (fluidity) as the original polymer solution, and no gel can be detected visually.

B High flowing gel. The gel appears to be only slightly more viscous than the initial relatively low-viscosity polymer solution.

C Flowing gel. Most of the obviously detectable gel flows to the bottle cap upon inversion.

D Moderately flowing gel. About 5 to 15 percent of the gel does not readily flow to the bottle cap upon inversion. These gels are usually characterized as "tonguing" gels; after hanging out of the bottle, the gel can be made to flow back into the bottle by slowly turning the bottle upright.

E Barely flowing gel. The gel slowly flows to the bottle cap and/or more than about 15 percent of the gel does not flow to the bottle cap upon inversion.

F Highly deformable nonflowing gel. The gel flows to just short of reaching the bottle cap.

G Moderately deformable non-flowing gel. The gel flows about halfway down to the bottle cap upon inversion.

H Slightly deformable nonflowing gel. The gel surface deforms only slightly upon inversion.

I Rigid gel. There is no gel surface deformation upon inversion.

J Ringing rigid gel. A tuning-fork-like mechanical vibration
can be felt after the bottle is tapped.

In the following examples, quantitative gel viscosity and elasticity determinations are made from measurements obtained with a Rheometrics 8500 pressure rheometer and a Rheometrics 8500 fluid spectrometer for temperatures ranging from 20° to 60° C. Samples are tested at atmospheric pressure, either for 18 hours with 15-minute sampling intervals or for 60 hours with 60-minute sampling intervals. The rotational velocity is 0.1 radian/sec, and the initial pH is between 6 and 8.

Example 4

An alginate solution of 1.5 percent by weight of high molecular weight sodium alginate is prepared as described in Example 1, and two 50 g. samples are placed in 4 oz. bottles. $BaHPO_4$ is added to one sample so that the concentration of $BaHPO_4$ is 0.0001M. The second sample contains 0.0006M $BaHPO_4$. The bottles are maintained at about 72° F. (22° C.), and qualitative gel strength observations are made as described above. The results are shown in FIG. 1. The gel strength of each sample reachs a maximum by about 24 hours and remains constant thereafter for at least 9 days. Gelation occurrs more rapidly and the gel strength is greater for the sample containing 0.0006M $BaHPO_4$.

Example 5

Figure 2A:
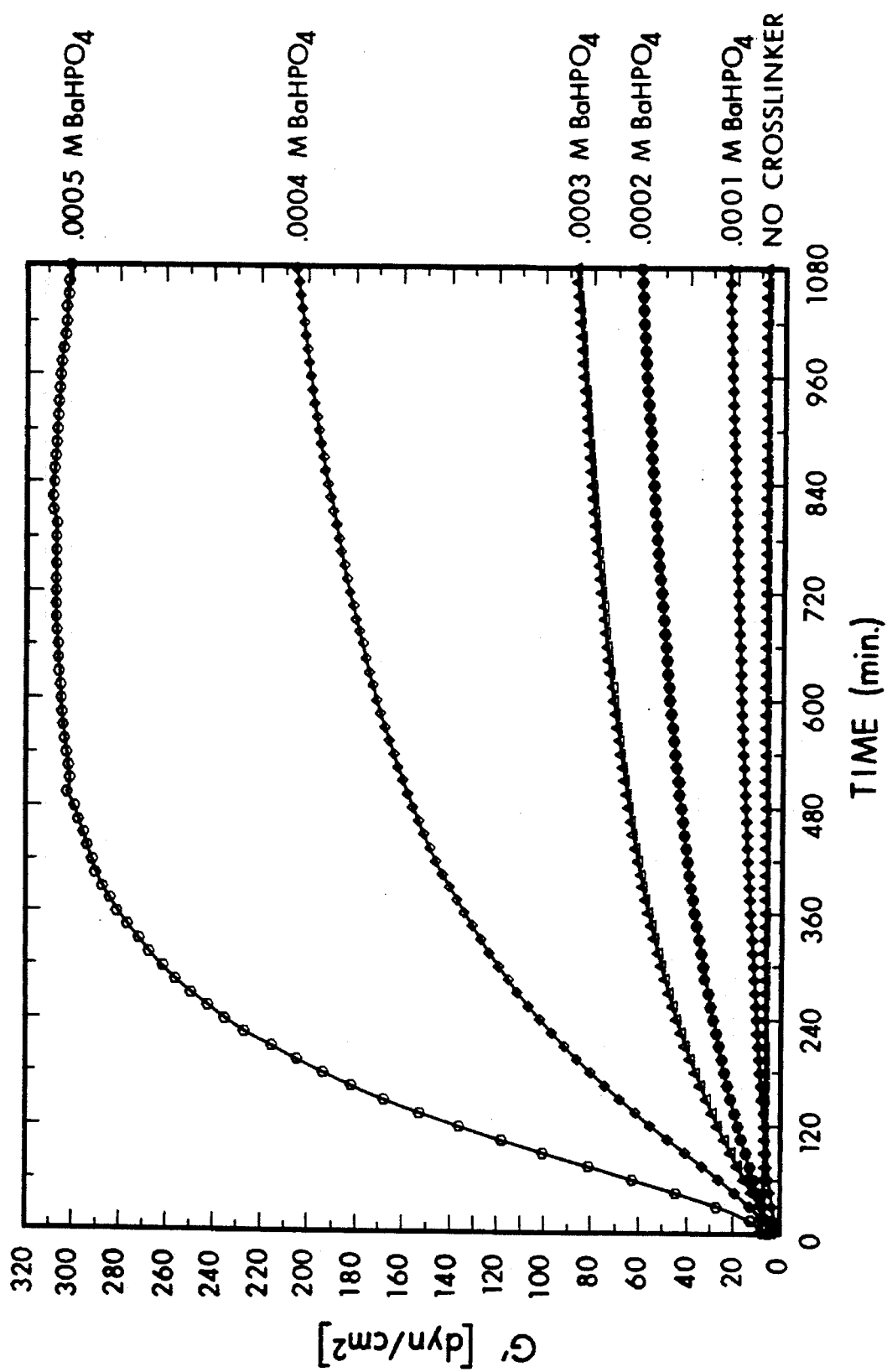

A solution of 1.5 percent by weight of high molecular weight alginate and 0.1 percent by weight sodium benzoate is prepared as described in Example 1. Six samples of the solution are taken. One is kept as a blank. BaHPO4 is added to the remaining samples so that the $BAHPO_4$ concentrations are 0.0001M, 0.0002M, 0.0003M, 0.0004M, and 0.0005M. A rheometer run is made with each sample at 25° C. for 18 hours with the instrument set for dynamic measurements every 15 minutes at 0.1 rad/sec. The results are shown in FIG. 2. For the blank, the elastic modulus, G', remains approximately constant between 6 and 8 $dyn/cm^2$, and the viscosity remains between about 120 and 130 cp during the entire test. For the 0.0001M sample, G' increases from 2 to about 23 $dyn/cm^2$ and viscosity from about 70 to about 275 cp in 18 hours. As the $BaHPO_4$ concentration increases, the rate of increase of G' and viscosity increases, as do the maximum values observed. For the 0.0005M sample, G' increases from about 6 to about 310 $dyn/cm^2$ in about 8 hours, and viscosity increases from about 250 to about 4000 $dyn/cm^2$ in 13 hours.

The agreement is excellent between the qualitative results of Example 1 and the quantitative results of Example 2. The apparent gel strength, G', and viscosity all increase with increasing crosslinker concentration. The rate of increase in gel strength, G', and viscosity also is greater with higher crosslinker concentrations.

Example 6

Gels are prepared with 1.5 weight percent medium (M) or high (H) molecular weight alginate. 50.0 g of alginate solution is weighed into a 4-oz wide mouth jar. The BaHPO$_4$ crosslinking agent is then added, and the jar is capped and shaken vigorously for approximately 10 seconds or until thorough mixing occurrs. The initial gel strength is A for medium molecular weight alginate and B for high molecular weight alginate. The qualitative gel strengths are coded after varying time intervals. The maximum gel strengths and the time required for maximum gelation are shown in Table I. The gel strength is greater with high molecular weight alginate and with higher BaHPO$_4$ concentrations.

TABLE I

| BaHPO$_4$ concentration | Gelation time, M alginate | Maximum gel strength | Gelation time, H alginate | Maximum gel strength |
|---|---|---|---|---|
| 0.0001M | 3 hr | C | 3 hr | D |
| 0.0002M | 3 hr | C | 2 hr | D |
| 0.0003M | 3 hr | C | 2 hr | D |
| 0.0004M | 3 hr | C | 21 hr | F |
| 0.0005M | 2 hr | C | 21 hr | F |
| 0.0006M | 2 hr | C | 21 hr | H |

Example 7

Gelation solutions are prepared as in Example 6, except that low molecular weight (L) alginate is also prepared, and the crosslinking agent is 0.0005M Ca(H$_2$PO$_4$)$_2$. Initial gel strength is slightly greater for medium and high molecular weight alginate, and gel strength increases rapidly to a higher value for high molecular weight alginate. The results are shown

TABLE II

| Gelation time | L alginate | M alginate | H alginate |
|---|---|---|---|
| 0 hr | A | B | B |
| 0.25 hr | A | B | G |
| 1 hr | A | C | H |
| 3 hr | A | C | H |
| 4 hr | A | C | I |

Example 8

Gelation solutions are prepared as in Example 6 using high molecular weight alginate and 0.007M calcium acetate as the crosslinking agent. 0.005M sodium citrate is added with the calcium acetate as a sequestering agent. The initial gel strength code is C. Gel strength increases to E within one hour and gradually increases to G during the next six days. The gelation rate and the maximum gel strength are less than the rate and strength observed for a lower calcium concentration and no sequestering agent in Example 7. Table III shows the results.

TABLE III

| Gelation time | Gel strength |
|---|---|
| 0 hr | C |
| 0.25 hr | D |
| 1 hr | E |
| 3 da | E |
| 4 da | F |
| 6 da | G |
| 10 da | G |

A series of experiments is run to simulate the effects of Brae Field reservoir fluids on gelation rates and gel strengths. The fluids include connate water, sea water used for flooding, and crude oil. Samples are kept at 80° C.

Example 9

Gelation solutions are prepared as in Example 6 using high molecular weight alginate and 0.0001M BaHPO$_4$ as the crosslinking agent. 0.25 weight % PVA is added with the crosslinker to the gelation solution as a modifier. 50 ml of either a 2.0 wt % NaCl solution, connate water, sea water, or crude oil are also added. Table IV shows the resulting gel strengths.

The initial gel strength code is C for all samples. Gel strength increases to D within 15 minutes and remains there for the samples with gel only, 2% NaCl solution, and crude oil. The connate water sample gel strength increases to I within three days and to J after six days. The sea water sample gel strength increases to H within three days and remains there. PVA increases the initial solution viscosity and decreases the gelation rate. Connate water increases the maximum gel strength obtained.

TABLE IV

| Gelation time | Gel only | 2.0 wt % NaCl | Connate water | Sea water | Crude oil |
|---|---|---|---|---|---|
| 0 | C | C | C | C | C |
| 15 min | D | D | D | D | D |
| 4 hr | D | D | D | D | D |
| 1 day | D | D | D | D | D |
| 3 days | D | D | I | H | D |
| 4 days | D | D | I | H | D |
| 5 days | D | D | I | H | D |
| 6 days | D | D | J | H | D |
| 7 days | D | D | J | H | D |
| 8 days | D | D | J | H | D |
| 9 days | D | D | J | H | D |
| 10 days | D | D | J | H | D |

Example 10

Gelation solutions are prepared as in Example 6 using high molecular weight alginate and 0.0001M BaHPO$_4$ as the crosslinking agent. 0.5 weight % PVA is added with the crosslinker to the gelation solution as a modifier. 50 ml of either a 2.0 wt % NaCl solution, connate water, sea water, or crude oil are also added.

Table V shows the resulting gel strengths. Increased PVA concentration increases the initial gel strengths from C to D. The final gel strengths also increase for the gel only, NaCl solution, and crude oil samples. The gelation rates and final gel strengths decrease for the connate water and sea water samples.

TABLE V

| Gelation time | Gel only | 2.0 wt % NaCl | Connate water | Sea water | Crude oil |
|---|---|---|---|---|---|
| 0 | D | D | D | D | D |
| 15 min | D | D | D | D | D |
| 4 hr | E | E | E | E | E |
| 1 day | F | F | F | F | F |
| 3 days | F | F | F | G | F |
| 4 days | G | F | F | G | G |
| 5 days | G | G | G | H | H |
| 6 days | G | G | G | H | H |
| 7 days | H | H | H | H | H |
| 8 days | H | H | H | H | H |

TABLE V-continued

| Gelation time | Gel only | 2.0 wt % NaCl | Connate water | Sea water | Crude oil |
|---|---|---|---|---|---|
| 9 days | H | H | H | H | H |
| 10 days | H | H | H | H | H |

Example 11

Gelation solutions are prepared as in Example 6 using high molecular weight alginate and 0.0006M $BaHPO_4$ as the crosslinking agent. 0.25 weight % PVA is added with the crosslinker to the gelation solution as a modifier. 50 ml of either a 2.0 wt % NaCl solution, connate water, sea water, or crude oil are also added.

Table VI shows the resulting gel strengths at various times. The results are similar to those obtained with 0.0001M $BaHPO_4$.

TABLE VI

| Gelation time | Gel only | 2.0 wt % NaCl | Connate water | Sea water | Crude oil |
|---|---|---|---|---|---|
| 0 | C | C | C | C | C |
| 15 min | D | D | D | D | D |
| 4 hr | D | D | D | D | D |
| 1 day | D | D | D | D | D |
| 3 days | D | D | I | H | D |
| 4 days | D | D | I | H | D |
| 5 days | D | D | I | H | D |
| 6 days | D | D | J | H | D |
| 7 days | D | D | J | H | D |
| 8 days | D | D | J | H | D |
| 9 days | F | F | J | H | D |
| 10 days | F | F | J | H | D |

Example 12

Gelation solutions are prepared as in Example 6 using high molecular weight alginate and 0.0006M $BaHPO_4$ as the crosslinking agent. 0.5 weight % PVA is added with the crosslinker to the gelation solution as a modifier. 50 ml of either a 2.0 wt % NaCl solution, connate water, sea water, or crude oil are also added. Table VII shows the resulting gel strengths. The gelation rate and the gel strength increase relative to the results obtained in Example 10 with 0.0001M $BaHPO_4$.

TABLE VII

| Gelation time | Gel only | 2.0 wt % NaCl | Connate water | Sea water | Crude oil |
|---|---|---|---|---|---|
| 0 | D | D | D | D | D |
| 15 min | E | E | E | E | E |
| 2 hr | F | F | F | F | F |
| 1 day | H | H | H | H | H |
| 3 days | H | H | H | I | H |
| 4 days | H | H | H | I | H |
| 5 days | H | H | H | I | I |
| 6 days | H | H | H | I | I |
| 7 days | H | H | H | I | I |
| 8 days | H | H | H | I | I |
| 9 days | H | H | J | I | I |
| 10 days | H | H | J | I | I |

Example 13

Gelation solutions are prepared as in Example 6 using high molecular weight alginate and 0.0005M $Ca(H_2PO_4)_2$ as the crosslinker. 0.25 weight % PVA is added with the crosslinker to the gelation solution as a modifier. 50 ml of either a 2.0 wt % NaCl solution, connate water, sea water, or crude oil are also added. Table VIII shows the resulting gel strengths, which are similar to those observed in Example 9 with 0.0001M $BaHPO_4$.

TABLE VIII

| Gelation time | Gel only | 2.0 wt % NaCl | Connate water | Sea water | Crude oil |
|---|---|---|---|---|---|
| 0 | C | C | C | C | C |
| 15 min | C | C | D | D | C |
| 4 hr | D | D | D | D | D |
| 1 day | D | D | D | E | D |
| 3 days | D | D | I | H | D |
| 4 days | D | D | I | H | D |
| 5 days | D | D | I | H | D |
| 6 days | D | D | J | H | D |
| 7 days | D | D | J | H | D |
| 8 days | D | D | J | H | D |
| 9 days | D | D | J | H | D |
| 10 days | D | D | J | H | D |

Example 14

Gelation solutions are prepared as in Example 6 using high molecular weight alginate and 0.0005M $Ca(H_2PO_4)_2$ as the crosslinking agent. 0.5 weight % PVA is added with the crosslinker to the gelation solution as a modifier. 50 ml of either a 2.0 wt % NaCl solution, connate water, sea water, or crude oil are also added. Table IX shows the resulting gel strengths. The gelation rates and gel strengths are lower than observed for $BaHPO_4$ in Example 12.

TABLE IX

| Gelation time | Gel only | 2.0 wt % NaCl | Connate water | Sea water | Crude oil |
|---|---|---|---|---|---|
| 0 | D | D | D | D | D |
| 15 min | D | D | D | D | D |
| 4 hr | D | D | D | D | D |
| 1 day | F | F | F | F | F |
| 3 days | F | F | F | G | F |
| 4 days | F | F | G | G | F |
| 5 days | F | G | G | H | F |
| 6 days | G | G | H | H | F |
| 7 days | G | G | I | H | F |
| 8 days | H | H | I | I | F |
| 9 days | H | H | I | I | F |
| 10 days | H | H | I | I | F |

Example 15

Gelation solutions are prepared as in Example 6 using high molecular weight alginate and 0.0006M $BaHPO_4$ as the crosslinking agent. 0.0006M adipic acid is added with the crosslinker to the gelation solution as a sequestering agent. 50 ml of either connate water or sea water are also added. Table X shows the resulting gel strengths. The adipic acid decreases the gelation rates significantly in comparison to the rates observed in Example 6.

TABLE X

| Time | Connate water | Sea water |
|---|---|---|
| 0 | C | C |
| 1 hr | C | C |
| 2 hr | D | D |
| 4 hr | D | D |

TABLE X-continued

| Time | Connate water | Sea water |
|---|---|---|
| 1 da | G | F |
| 3 da | I | H |
| 4 da | I | H |
| 5 da | J | I |
| 10 da | J | I |

Example 16

Gelation solutions are prepared as in Example 14 using high molecular weight alginate and 0.0006M BaHPO$_4$ as the crosslinking agent. 0.0006M adipic acid is added with the crosslinker to the gelation solution as a sequestering agent, and 0.25 wt % PVA is also added as a modifier. 50 ml of either connate water or sea water are also added. Table XI shows the resulting gel strengths. The results are similar to those obtained in Example 11 without adipic acid.

TABLE XI

| Time | Connate water | Sea water |
|---|---|---|
| 0 | C | C |
| 15 min | D | D |
| 4 hr | D | D |
| 1 da | E | E |
| 3 da | I | H |
| 4 da | I | H |
| 5 da | I | H |
| 6 da | J | H |
| 10 da | J | H |

Example 17

Gelation solutions are prepared as in Example 14 using high molecular weight alginate and 0.007M calcium acetate as the crosslinking agent. 0.005M sodium citrate is added with the crosslinker to the gelation solution as a sequestering agent. 50 ml of either connate water or sea water are also added. Table XII shows the resulting gel strengths. The gelation rate is significantly slower than the rate observed in Example 7 for a lower calcium concentration.

TABLE XII

| Time | Connate water | Sea water |
|---|---|---|
| 0 | C | C |
| 15 min | E | E |
| 2 hr | E | E |
| 4 hr | F | F |
| 1 da | H | G |
| 3 da | I | I |
| 4 da | I | I |
| 5 da | I | J |
| 6 da | I | J |
| 7 da | I | J |
| 8 da | J | J |
| 9 da | J | J |
| 10 da | J | J |

ALTERNATIVES

While the foregoing preferred embodiments of the invention have been described, it is understood that alternatives and modifications such as those suggested and others, may be made thereto and fall within the scope of the invention.

I claim:

1. A method for modifying the fluid flow profile in a subterranean formation having a heterogeneous permeability distribution, the method comprising:

a) forming a composition comprising an aqueous solution of an alginate polysaccharide having a molecular weight between about 80,000 Daltons and about 200,000 Daltons, the polysaccharide being present in an amount up to about 10 percent by weight, a crosslinking agent selected from the group consisting of Group IIA cations, $Fe^{2+}$, $Fe^{3+}$, $Al^{3+}$, $Mn^{2+}$, $Zn^{2+}$, dialdehydes, diamines, and mixtures thereof, the crosslinking agent being present in an amount ranging from about 0.0001M to about 0.05M, and a modifier present in an amount up to about 5 percent by weight and selected from the group consisting of synthetic polymers consisting of polyvinyl alcohols, neutral polycarboxylic acids, polyacrylamides, and mixtures thereof, the solution capable of forming a gel;

b) injecting the composition into a subterranean formation: and c) allowing the composition to form a gel.

2. The method of claim 1 wherein said alginate polysaccharide is present in an amount between about 0.5 percent and about 2 percent by weight.

3. The method of claim 1 wherein said alginate polysaccharide has a molecular weight between about 120,000 and about 190,000 Daltons.

4. The method of claim 1 wherein said alginate polysaccharide is derived from algae of the species *Macrocystis pyrifera*.

5. The method of claim 1 wherein said crosslinking agent is present at a concentration between about 0.0001M and about 0.001M.

6. The method of claim 1 wherein said modifier is 87–89 percent hydrolyzed polyvinyl alcohol with a molecular weight between about 13 and about 186 Daltons.

7. The method of claim 1 wherein said composition further comprises a sequestering agent selected from citrate, phosphate, pyrophosphate, EDTA, adipic acid, salts of D-gluconic acid, and mixtures thereof, at a concentration up to about 5 percent by weight.

8. The method of claim 7 wherein said sequestering agent is present at a concentration up to about 0.005M.

9. The method of claim 1 wherein said gel has a strength which is controlled by varying the molecular weight of said polysaccharide between about 80,000 and about 200,000 Daltons.

10. The method of claim 1 wherein said gel has a strength which is controlled by varying the concentration of said polysaccharide between about 0 percent and about 10 percent by weight.

11. The method of claim 1 wherein said gel has a strength which is controlled by varying the concentration of said crosslinking agent between about 0.0001M and about 0.05M.

12. The method of claim 1 wherein said gel has a strength which is controlled by varying said crosslinking agent selected from the group of Group IIA cations, $Fe^{2+}$, $Fe^{3+}$, $Al^{3+}$, $Mn^{2+}$, $Zn^{2+}$, dialdehydes, diamines, and mixtures thereof.

13. The method of claim 1 wherein said gel has a strength which is controlled by varying the modifier selected from the group of polyvinyl alcohols, polycarboxylic acids, polyacrylamides, and mixtures thereof.

14. The method of claim 1 wherein said gel has a strength which is controlled by varying the concentration of said modifier between about 0 percent and about 5 percent by weight.

15. The method of claim 1 wherein said gel has a strength which is controlled by varying the concentration of said polysaccharide between about 0 percent and about 10 percent by weight.

16. The method of claim 1 wherein said solution has a gelation rate which is controlled by varying said crosslinking agent selected from the group of Group IIA cations, $Fe^{2+}$, $Fe^{3+}$, $Al^{3+}$, $Mn^{2+}$, $Zn^{2+}$, dialdehydes, diamines, and mixtures thereof.

17. The method of claim 1 wherein said solution has a gelation rate which is controlled by varying the concentration of said crosslinking agent between about 0.0001M and about 0.05M.

18. The method of claim 1 wherein said solution has a gelation rate which is controlled by varying the type of modifier selected from the group of synthetic polymers consisting of polyvinyl alcohols, neutral polycarboxylic acids, polyacrylamides, and mixtures thereof.

19. The method of claim 1 wherein said solution has a gelation rate which is controlled by varying the concentration of said modifier between about 0 percent and about 5 percent by weight.

20. The method of claim 1 wherein said solution has a gelation rate which is controlled by adding a sequestering agent to delay gelation, the sequestering agent selected from citrate, phosphate, pyrophosphate, EDTA, adipic acid, and mixtures thereof.

21. The method of claim 1 wherein syneresis of said gel is controlled by varying said concentration of said modifier in said solution between zero percent and about 5 percent by weight.

22. The method of claim 1 wherein syneresis of said gel is controlled by varying said modifier selected from the group of polyvinyl alcohols, neutral polycarboxylic acids, polyacrylamides, and mixtures thereof.

23. The method of claim 1 further comprising:

d) injecting a reservoir flooding fluid into said formation, said gel diverting said fluid into a portion of said formation not occupied by said gel.

* * * * *

UNITED STATES PATENT AND TRADEMARK OFFICE
CERTIFICATE OF CORRECTION

PATENT NO. : 5,563,186
DATED : October 8, 1996
INVENTOR(S) : Ronald G. Thompson

It is certified that error appears in the above-indentified patent and that said Letters Patent is hereby corrected as shown below:

Col. 4, line 26 : Delete "PVS" at both occurrences and insert --PVA-- at both occurrences.
Col. 5, line 24 : Delete "therefor".
Col. 10, line 2 : Delete "NaCI" and insert --NaCl--.
Col. 10, line 28 : Delete "NaCI" and insert --NaCl--.

Signed and Sealed this

Sixteenth Day of March, 1999

Attest:

Attesting Officer

Q. TODD DICKINSON

Acting Commissioner of Patents and Trademarks